US009922423B2

United States Patent
Oami

(10) Patent No.: US 9,922,423 B2
(45) Date of Patent: Mar. 20, 2018

(54) IMAGE ANGLE VARIATION DETECTION DEVICE, IMAGE ANGLE VARIATION DETECTION METHOD AND IMAGE ANGLE VARIATION DETECTION PROGRAM

(71) Applicant: NEC Corporation, Minato-ku, Tokyo (JP)

(72) Inventor: Ryoma Oami, Tokyo (JP)

(73) Assignee: NEC CORPORATION, Tokyo (JP)

( * ) Notice: Subject to any disclaimer, the term of this patent is extended or adjusted under 35 U.S.C. 154(b) by 39 days.

(21) Appl. No.: 14/414,154

(22) PCT Filed: Jun. 17, 2013

(86) PCT No.: PCT/JP2013/003762
§ 371 (c)(1),
(2) Date: Jan. 12, 2015

(87) PCT Pub. No.: WO2014/010174
PCT Pub. Date: Jan. 16, 2014

(65) Prior Publication Data
US 2015/0146988 A1  May 28, 2015

(30) Foreign Application Priority Data

Jul. 12, 2012  (JP) .................................. 2012-156772

(51) Int. Cl.
*G06K 9/48* (2006.01)
*G06T 7/00* (2017.01)
(Continued)

(52) U.S. Cl.
CPC ............ *G06T 7/0042* (2013.01); *G01B 11/14* (2013.01); *G06K 9/52* (2013.01); *G06T 7/246* (2017.01);
(Continued)

(58) Field of Classification Search
None
See application file for complete search history.

(56) References Cited

U.S. PATENT DOCUMENTS

2003/0012410 A1* 1/2003 Navab .................... G06K 9/209
382/103
2004/0201756 A1* 10/2004 VanBree ................. H04N 5/222
348/239

(Continued)

FOREIGN PATENT DOCUMENTS

JP    2004-343737 A    12/2004
JP    2009-38558 A     2/2009
(Continued)

OTHER PUBLICATIONS

International Search Report for PCT Application No. PCT/JP2013/003762, dated Jul. 23, 2013.

*Primary Examiner* — Sumati Lefkowitz
*Assistant Examiner* — David Perlman

(57) ABSTRACT

An image angle variation detection means 81 detects an image angle variation of a imaging device from videos shot by the imaging device based on fixed point information including the position of a fixed point specified by an image angle of the imaging device and the features indicating the characteristics of the fixed point, and a situation determination means 82 determines that the image angle of the imaging device is varied when a change in the image angle variation is stable for a certain period of time.

12 Claims, 7 Drawing Sheets

(51) Int. Cl.
  *H04N 5/232*      (2006.01)
  *H04N 17/00*      (2006.01)
  *G01B 11/14*      (2006.01)
  *G06K 9/52*       (2006.01)
  *G06T 7/246*      (2017.01)

(52) U.S. Cl.
  CPC ........... *H04N 5/232* (2013.01); *H04N 17/002* (2013.01); *G06T 2207/30244* (2013.01)

(56) References Cited

U.S. PATENT DOCUMENTS

| | | | |
|---|---|---|---|
| 2006/0188131 A1* | 8/2006 | Zhang | G06T 7/74 382/103 |
| 2011/0164870 A1* | 7/2011 | Manson | F16M 11/14 396/428 |
| 2011/0194731 A1* | 8/2011 | BenHimane | G06K 9/6211 382/103 |
| 2013/0243302 A1* | 9/2013 | Liu | G06T 3/0075 382/133 |

FOREIGN PATENT DOCUMENTS

| | | | |
|---|---|---|---|
| JP | 2009-122859 A | * | 6/2009 |
| JP | 2009-267466 A | | 11/2009 |

\* cited by examiner

IMAGE ANGLE VARIATION DETECTION DEVICE, IMAGE ANGLE VARIATION DETECTION METHOD AND IMAGE ANGLE VARIATION DETECTION PROGRAM

This application is a National Stage Entry of PCT/JP2013/003762 filed on Jun. 17, 2013, which claims priority from Japanese Patent Application 2012-156772 filed on Jul. 12, 2012, the contents of all of which are incorporated herein by reference, in their entirety.

TECHNICAL FIELD

The present invention relates to an image angle variation detection device for detecting an image angle variation of an imaging device, an image angle variation detection method, and an image angle variation detection program.

BACKGROUND ART

In typical monitoring systems, when an image angle of a camera is varied due to an earthquake or the like, the camera is calibrated again thereby to return the image angle of the camera to the original state. With a camera having the pan/tilt/zoom function, the orientation (angle) of the camera is stored, and thus when the camera is recovered from blackout or the like, the posture of the camera can be automatically recovered based on the stored angle.

On the other hand, there is also known a planetary exploration spacecraft for automatically correcting the orientation of a camera. The planetary exploration spacecraft detects the position of a specific star such as Canopus by a star tracker thereby to automatically correct the orientation of the camera.

Patent Literature 1 describes a monitoring camera correction device therein. The correction device described in Patent Literature 1 stores a reference pattern for giving a positional reference for correcting an offset of a shot image. The reference pattern is a modeled initial positional relationship for a specific part present in an already-known position in a monitored area. The correction device described in Patent Literature 1 corrects an image to match a comparative pattern with the reference pattern.

CITATION LIST

Patent Literature

PLT 1: JP 2009-38558 A

SUMMARY OF INVENTION

Technical Problem

It takes some time to confirm an image angle offset of a camera and to calibrate each camera whenever an earthquake or the like occurs. A camera having the pan/tilt/zoom function is used in many cases for saving time.

However, the camera having the pan/tilt/zoom function only stores the orientation of the camera. Thus, there is a problem that when the camera platform fixing the camera thereon is moved, the original image angle cannot be obtained.

The method for correcting the orientation of a camera in a planetary exploration spacecraft has been described above, but the environments are almost different between the space in which a camera used for a typical monitoring system shoots and the outer space. For example, a camera used in a typical monitoring system may be influenced by blowing wind around its installation place, or a foreground object may move in front of the camera. As described above, even if the camera shooting environment is variously influenced, it is desirable to properly detect an image angle variation.

Patent Literature 1 describes that an image is shot by a monitoring camera attached near a door mirror of the vehicle. It is assumed that the monitoring camera attached near a door mirror of the vehicle is particularly subjected to wind and its image angle frequently changes. However, Patent Literature 1 does not describe a method for handling the same at all. That is, the correction device described in Patent Literature 1 has a problem that an image is corrected for each influence of the shooting environment.

It is therefore an exemplary object of the present invention to provide an image angle variation detection device capable of properly detecting an image angle variation depending on a shooting environment of an imaging device, an image angle variation detection method, and an image angle variation detection program.

Solution to Problem

An image angle variation detection device according to the present invention includes an image angle variation detection means which detects an image angle variation of an imaging device from videos shot by the imaging device based on fixed point information including the position of a fixed point specified by an image angle of the imaging device and the features indicating the characteristics of the fixed point, and a situation determination means which determines that the image angle of the imaging device is varied when a change in the image angle variation is stable for a certain period of time.

An image angle variation detection method according to the present invention includes the steps of detecting an image angle variation of an imaging device from videos shot by the imaging device based on fixed point information including the position of a fixed point specified by an image angle of the imaging device and the features indicating the characteristics of the fixed point, and determining that the image angle of the imaging device is varied when a change in the image angle variation is stable for a certain period of time.

An image angle variation detection program according to the present invention is characterized by causing a computer to perform an image angle variation detection processing of detecting an image angle variation of an imaging device from videos shot by the imaging device based on fixed point information including the position of a fixed point specified by an image angle of the imaging device and the features indicating the characteristics of the fixed point, and a situation determination processing of determining that the image angle of the imaging device is varied when a change in the image angle variation is stable for a certain period of time.

Advantageous Effects of Invention

According to the present invention, it is possible to properly detect an image angle variation depending on a shooting environment of an imaging device.

DESCRIPTION OF EMBODIMENTS

Embodiments according to the present invention will be described below with reference to the drawings.

First Exemplary Embodiment

Figure 1:
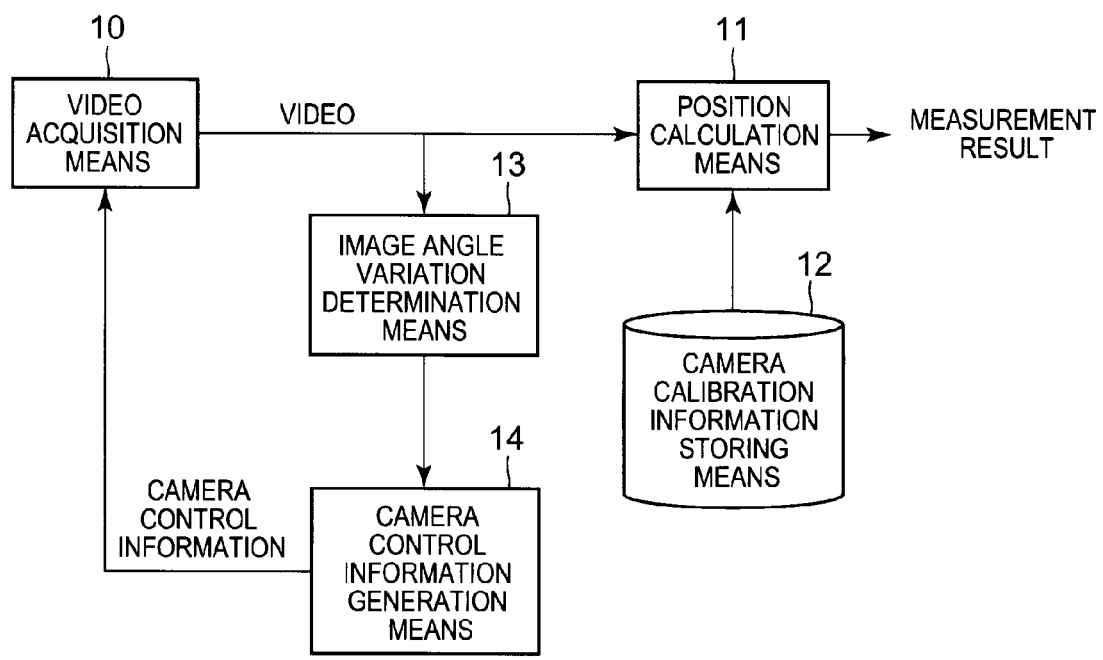
FIG. 1 It depicts a block diagram illustrating an exemplary structure of an image angle variation detection device according to a first exemplary embodiment of the present invention.

FIG. 1 is a block diagram illustrating an exemplary structure of an image angle variation detection device according to a first exemplary embodiment of the present invention. The image angle variation detection device according to the present exemplary embodiment includes a video acquisition means 10, a position calculation means 11, a camera calibration information storing means 12, an image angle variation determination means 13, and a camera control information generation means 14.

The video acquisition means 10 shoots a video and inputs the video into the position calculation means 11 and the image angle variation determination means 13. The video acquisition means 10 is realized by an imaging device such as camera. In the present exemplary embodiment, the image angle variation detection device is assumed to detect an image angle variation of the video acquisition means 10. In the present exemplary embodiment, the video acquisition means 10 is assumed as an imaging device whose image angle can be controlled from the outside.

The position calculation means 11 extracts the positions of objects or persons from the video input from the video acquisition means 10. Specifically, the position calculation means 11 transforms the two-dimensional positions acquired from the input video into a real space coordinate system and calculates the real space positions or sizes of the persons or objects by use of camera calibration information described later.

For example, by calculating the person positions, the time-sequentially calculated positional data become trajectory information, and thus the behaviors of the persons can be analyzed by analyzing the information. This fact can be applied for security purpose to detect an invasion of a person into a specific region or a person loitering around a specific region, for example. For example, the trajectories of workers in a factory or distribution warehouse are visualized thereby to consider whether a working efficiency can be enhanced. Further, when the fact is applied to retail works, the trajectory information can be used for enhancing a working efficiency of workers, and additionally the trajectories of clients can be calculated. Thus, the trajectory information is used thereby to acquire information available to marketing.

Additionally, the positions of objects are calculated thereby to detect a left object and to alert it, for example. Further, the position calculation means 11 calculates the sizes of objects thereby to classify the objects (classify persons and objects, for example). In this way, the information calculated by the position calculation means 11 can be used as basic data for trajectory analysis or object analysis.

The camera calibration information storing means 12 stores camera calibration information used by the position calculation means 11 for calculating the real space positions or sizes of persons or objects. The camera calibration information is previously stored in the camera calibration information storing means 12 by a user or the like, for example. The camera calibration information may be called camera parameters, which are classified into internal parameters and external parameters.

The internal parameters include a parameter describing a distortion of an image due to lens distortion, or a parameter describing a focal distance (zoom rate). The external parameters include a parameter expressing a position or orientation (posture) of the installed camera. The position calculation means 11 calculates a three-dimensional (real space) position from a two-dimensional coordinate of an image by use of the parameters. For example, in order to specify the position of a person, the position calculation means 11 calculates a coordinate of the foot of the person on the image and transforms it into a real space position (or the position on the floor where the person is standing) based on the camera calibration information.

The method for calculating a real space three-dimensional coordinate from a two-dimensional coordinate on an image based on camera calibration information (camera parameters) is widely known, and thus a detailed description thereof will be omitted herein.

The image angle variation determination means 13 determines whether the image angle is varied by use of the input videos. When a variation is present, the image angle variation determination means 13 calculates the amount of variation or parameters describing the variation. Information on an image angle variation will be denoted as image angle variation information below.

The camera control information generation means 14 calculates the pan/tilt amounts for returning the image angle of the video acquisition means 10 to the original one based on the image angle variation information generated by the image angle variation determination means 13, and inputs the calculated information as camera control information into the video acquisition means 10. The video acquisition means 10 adjusts the image angle based on the camera control information and returns it to the state before the variation.

The method for calculating the pan/tilt amounts required for returning an image angle to the original can be anything applicable for this purpose. That is, the camera control information is a parameter for moving the camera by the amount of variation determined by the image angle variation determination means 13. For example, the amount of motion of pixels when a pan angle is changed is determined depending on a degree of zoom. Thus, the camera control information generation means 14 previously stores a relationship between the pan angle and the amount of motion of pixels for a current degree of zoom, and when the image angle is varied, the camera control information generation means 14 may calculate the amount of motion based on an apparent motion of the video thereby to find a pan angle. A tilt angle can be calculated in a similar way.

The method for calculating camera control information by the camera control information generation means 14 is not limited to the above method. The camera control information generation means 14 may previously define the functions for calculating the pan/tilt amounts depending on the amount of variation, and calculate the camera control information based on the functions, for example. The method for calculating the pan/tilt amounts is widely known, and thus a detailed description thereof will be omitted herein.

Figure 2:
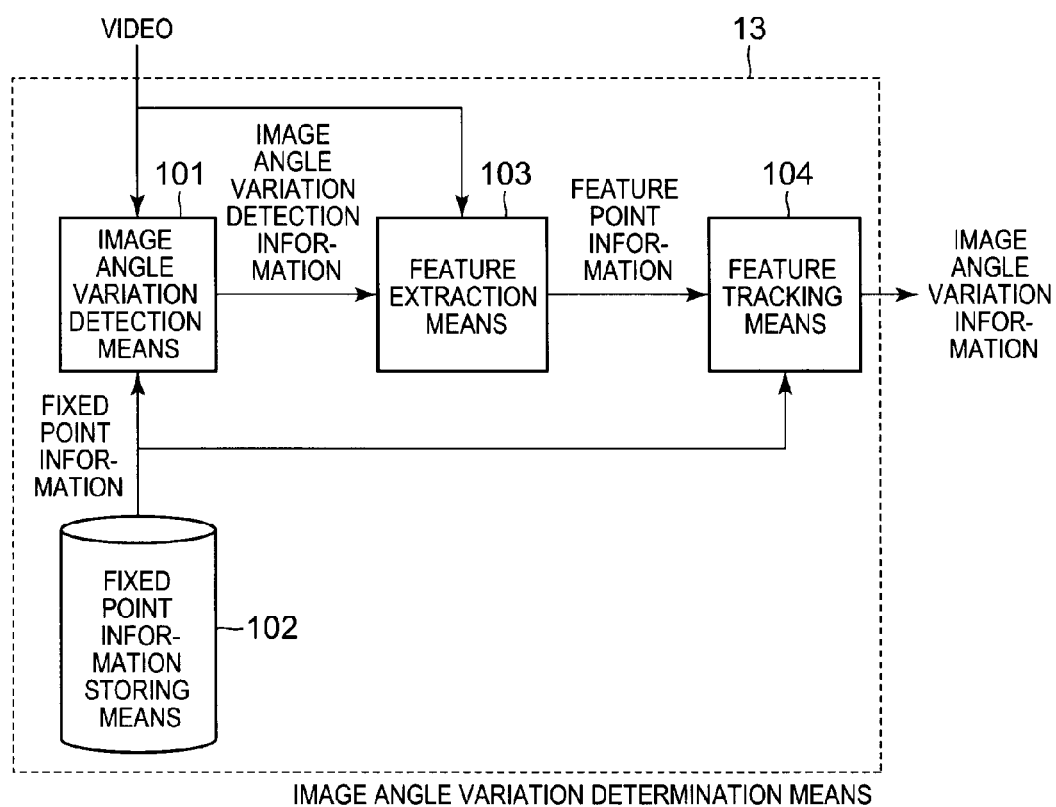
FIG. 2 It depicts a block diagram illustrating an exemplary structure of an image angle variation determination means according to the first exemplary embodiment.

The contents of the image angle variation determination means 13 will be further described below. FIG. 2 is a block diagram illustrating an exemplary structure of the image angle variation determination means 13 according to the present exemplary embodiment. The image angle variation determination means 13 includes an image angle variation detection means 101, a fixed point information storing means 102, a feature extraction means 103, and a feature tracking means 104.

The fixed point information storing means 102 stores fixed point information including the position of a fixed point and the features indicating the characteristics of the fixed point. Herein, the fixed point indicates a point which is specified from a video shot by the video acquisition means 10 and is stable in its position and features for a certain period of time or more.

The position of a fixed point is expressed by information (such as two-dimensional coordinate) capable of specifying a position in the image. The features of the fixed point is expressed by luminance gradient information, SIFT (Scale Invariant Feature Transform), SURF (Speeded-Up Robust Feature) or the like, but is not limited thereto and may use various features for describing the characteristics such as color or pattern of an image region around the fixed point.

In the present exemplary embodiment, it is assumed that a fixed point is previously defined by the user or the like and the position and the features of the fixed point are previously stored in the fixed point information storing means 102. For example, the user may visually determine a fixed point such as corner of a building, thereby specifying the point as a fixed point.

When being input with a new video from the video acquisition means 10, the image angle variation detection means 101 detects, from the input video based on the fixed point information, whether the image angle of the video acquisition means 10 is varied. In the following, information indicating whether the image angle is varied and information indicating the contents of a variation when the image angle is varied will be collectively denoted as image angle variation detection information.

Specifically, the image angle variation detection means 101 calculates the features of the input video at the same position as the position of the fixed point stored in the fixed point information storing means 102 and compares it with the features of the fixed point, and calculates the number of fixed points with the almost matched features. When a certain number of matched fixed points or more is present, the image angle variation detection means 101 determines that the image angle is not varied, and generates the image angle variation detection information indicating that the image angle is not varied.

On the other hand, when a certain number of matched fixed points or more is not present, the image angle variation detection means 101 determines that the image angle is varied, and generates the information indicating that the image angle is varied and the information indicating the contents of the variation as image angle variation detection information. The image angle variation detection means 101 inputs the generated image angle variation detection information into the features extraction means 103.

There has been described above the method for calculating the number of points matching with a fixed point and detecting whether an image angle is varied by the image angle variation detection means 101. The method for detecting whether an image angle is varied is not limited to the method for calculating the number of points matching with a fixed point. The image angle variation detection means 101 may determine that the input image is highly similar to the image indicated by the fixed point information as the statistic amount (such as average or median, and percentile value) of a distance between the feature vectors indicating the features becomes smaller, and may determine that the image angle is varied when the similarity lowers a predetermined threshold.

That is, when a difference between the input image and the image indicated by the fixed point information is larger than a predetermined amount, the image angle variation detection means 101 may determine that the image angle is varied.

The feature extraction means 103 extracts feature points from the input video, and extracts the features at the position of each feature point. The feature extraction means 103 calculates the features such as SIFT or SURF, but the contents of the features are not limited to SIFT or SURF. The method for extracting a feature point and the method for calculating SIFT or SURF are widely known, and thus a detailed description thereof will be omitted herein. The feature extraction means 103 calculates the features capable of being compared with the features included in the fixed point information. In the following, information including the coordinate of a feature point and the features of the feature point extracted by the feature extraction means 103 will be denoted as feature point information.

The feature changes due to a variation of illumination condition, or the like. For example, when shooting is conducted outdoor, the feature changes due to a variation of sunlight. Thus, the feature extraction means 103 may calculate the features when the image angle is not varied. The features do not need to be frequently calculated for a point with the stable features, and thus the feature extraction means 103 may less frequently calculate the features for such a feature point.

When the image angle variation detection information indicates that the image angle is varied, the feature tracking means 104 collates the fixed point with the feature point in the search range and associates them, and calculates a parameter (which will be denoted as image angle variation parameter) for transforming the position of each feature point into the position of its corresponding fixed point. The feature tracking means 104 then calculates an image angle variation parameter capable of transforming the largest number of feature points into the corresponding fixed points.

The feature tracking means 104 may calculate a distance or similarity between the calculated features of the feature point and the features of the fixed point, for example. In this case, the feature tracking means 104 extracts a pair of feature point and fixed point for which the calculated distance is a predetermined threshold or less or the calculated similarity is a predetermined threshold or more, and calculates parameter candidates for transforming the image angle by use of the extracted pair. That is, the pair indicates a combination of the feature point and the corresponding fixed point. The feature tracking means 104 then calculates, as a parameter candidate, a rotation/translation parameter when the feature point moves to the extracted paired fixed point. At this time, the feature tracking means 104 may calculate a parameter by use of affine transform, for example.

Then, the feature tracking means 104 may calculate parameter candidates for a plurality of extracted pairs, and assume a parameter candidate with the highest frequency as an image angle variation parameter. At this time, the feature tracking means 104 may randomly select a pair from among the pairs.

When the feature point search range is determined, the feature tracking means 104 may arbitrarily move and transform the input video, and calculate a distance or similarity between the features of the fixed point and the features of the feature point. Then, the feature tracking means 104 may assume, as an image angle variation parameter, a parameter indicating motion or transformation into a state in which the calculated distance is a predetermined threshold or less or the calculated similarity is a predetermined threshold or more.

The feature tracking means 104 temporarily stores the calculated image angle variation parameters. Then, the feature tracking means 104 similarly calculates image angle variation parameters also for a next input video (or a next frame in the video). The feature tracking means 104 compares the temporarily-stored image angle variation parameters with the newly-calculated image angle variation parameter. In a state in which a change between both the parameters is lower than a predefined threshold continues for a certain number of frames, the feature tracking means 104 determines that the image angle is varied, and outputs the image angle variation parameter as image angle variation information. That is, the feature tracking means 104 determines that the image angle of the video acquisition means 10 is varied when the change in image angle variation is stable for a certain period of time. Herein, being stable for a certain period of time indicates that a change in image angle variation parameter between frames is within a predetermined threshold in a predetermined period of time.

For example, a change in video when the camera swings in the wind for a moment does not necessarily indicate that the image angle is varied. In the present exemplary embodiment, when a change in image angle variation parameter between frames in the input videos is stable for a certain period of time, the feature tracking means 104 determines that the image angle of the video acquisition means 10 is varied. Thus, erroneous detection due to an instant image angle variation can be avoided.

The feature tracking means 104 may determine whether the calculated image angle variation parameter is within a typical image angle variation range. In the typical image angle variation range, the feature tracking means 104 may instruct the camera control information generation means 14 to generate camera control information. On the other hand, not in the typical image angle variation range, the video acquisition means 10 cannot return to the state before the variation based on the camera control information. In this case, the feature tracking means 104 may only alert the varied image angle, and promote the user to perform manual calibration again.

The image angle variation detection means 101, the feature extraction means 103 and the feature tracking means 104 are realized by the CPU in a computer operating according to a program (image angle variation detection program). For example, the program is stored in a storage unit (not illustrated) in the image angle variation determination means 13, and the CPU reads the program and may operate as the image angle variation detection means 101, the feature extraction means 103 and the feature tracking means 104 according to the program. Further, the image angle variation detection means 101, the feature extraction means 103 and the feature tracking means 104 may be realized in dedicated hardware, respectively.

The fixed point information storing means 102 is realized by a magnetic disk or the like, for example.

Figure 3:
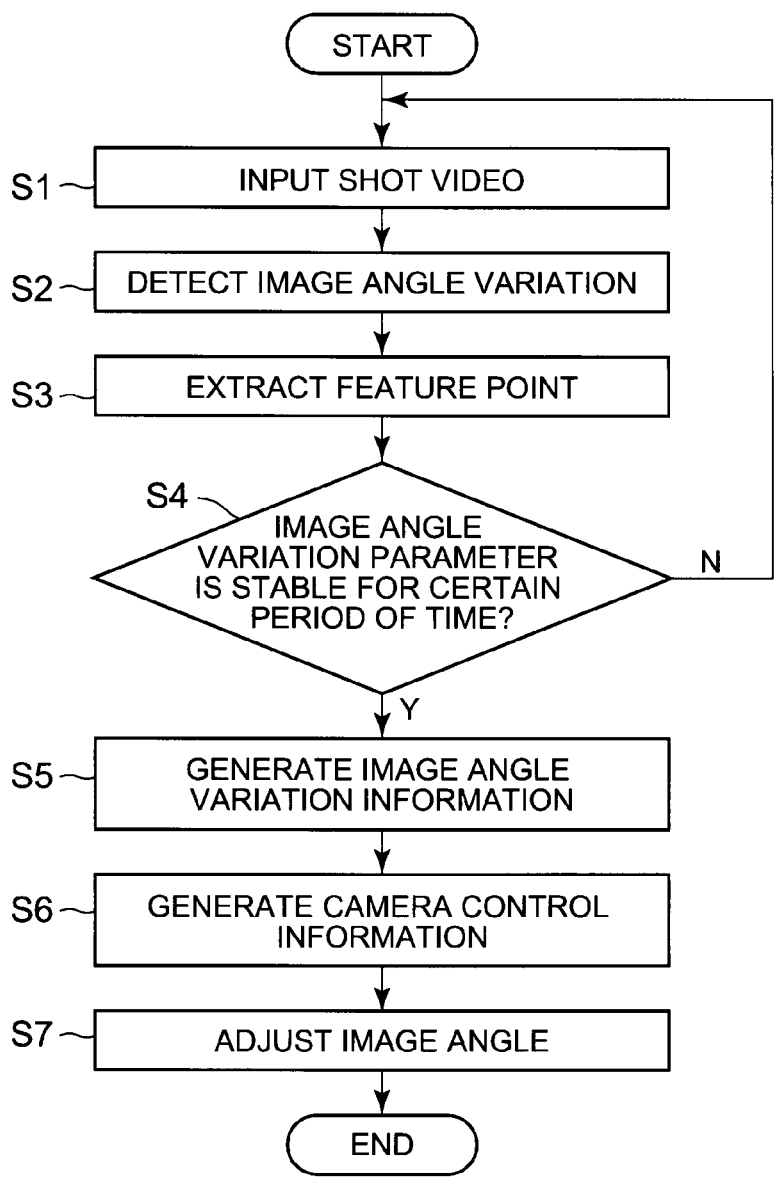
FIG. 3 It depicts a flowchart illustrating exemplary operations of the image angle variation detection device according to the first exemplary embodiment.

The operations of the image angle variation detection device according to the present exemplary embodiment will be described below. FIG. 3 is a flowchart illustrating the exemplary operations of the image angle variation detection device according to the first exemplary embodiment.

The video acquisition means 10 inputs a shot image into the image angle variation determination means 13 (step S1). The image angle variation detection means 101 detects an image angle variation of the video acquisition means 10 from the videos shot by the video acquisition means 10 based on the fixed point information (step S2). The image angle variation detection means 101 may calculate the number of fixed points for which the features at the same position as the position of the fixed point in the input video almost match with the features of the fixed point, for example. The image angle variation detection means 101 may then determine that the image angle is varied when a certain number of matched fixed points or more is not present.

The feature extraction means 103 extracts a feature point from the input video (step S3). The feature tracking means 104 associates the fixed point with the feature point, and calculates an image angle variation parameter. The feature tracking means 104 then determines whether the image angle variation parameter is stable for a certain period of time (step S4). When the image angle variation parameter is not stable for a certain period of time (N in step S4), the processings of detecting an image angle variation subsequent to step S1 are repeatedly performed on the input videos.

On the other hand, when the image angle variation parameter is stable for a certain period of time (Y in step S4), the feature tracking means 104 determines that the image angle of the video acquisition means 10 is varied, and generates image angle variation information including the image angle variation parameter and inputs it into the camera control information generation means 14 (step S5). The camera control information generation means 14 then generates camera control information based on the input image angle variation information, and inputs it into the video acquisition means 10 (step S6). The video acquisition means 10 adjusts the image angle based on the input camera control information, and returns it to the non-varied state (step S7).

As described above, according to the present exemplary embodiment, the image angle variation detection means 101 detects an image angle variation of the video acquisition means 10 from the videos shot by the video acquisition means 10 based on the fixed point information. The feature tracking means 104 then determines that the image angle of the video acquisition means 10 is varied when a change in the image angle variation is stable for a certain period of time. Thus, it is possible to properly detect an image angle variation depending on a shooting environment of the imaging device.

When the power supply is powered again, the camera with the pan/tilt/zoom function is generally controlled to return to the original angle, but its accuracy depends on a camera. Thus, the image angle variation detection device according to the present exemplary embodiment is applied to the camera with the pan/tilt/zoom function, thereby enhancing the accuracy of returning to the original angle.

A variant of the image angle variation detection device according to the first exemplary embodiment will be described below. The first exemplary embodiment assumes that the video acquisition means 10 is an imaging device whose image angle can be controlled from the outside. That is, in the first exemplary embodiment, the video acquisition means 10 adjusts the image angle based on the camera control information generated by the camera control information generation means 14, and returns it to the image angle before the variation.

Figure 4:
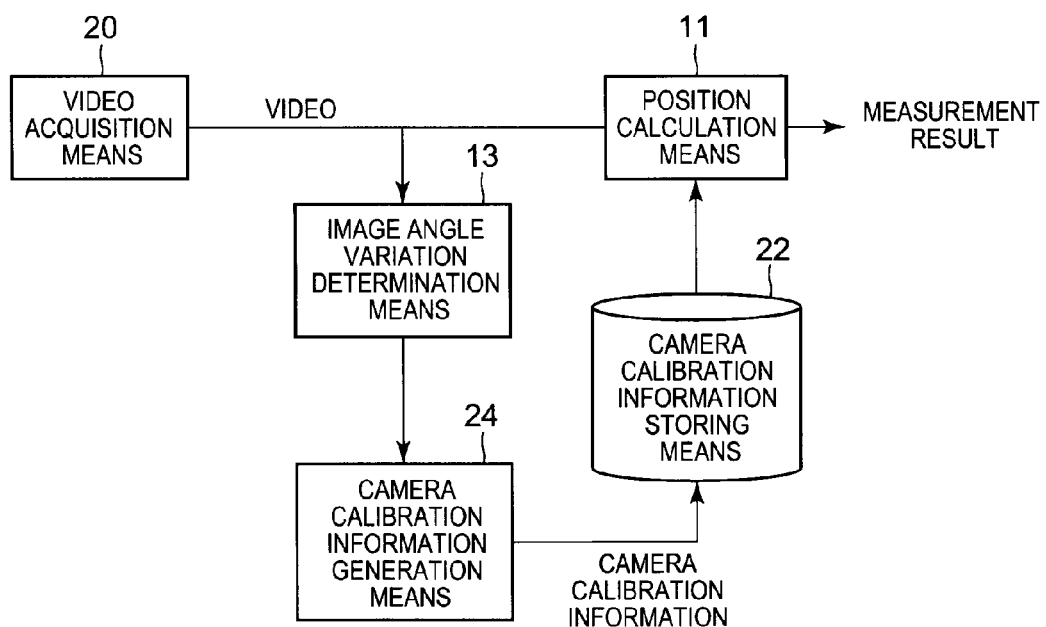
FIG. 4 It depicts a block diagram illustrating an exemplary structure of a variant of the image angle variation detection device according to the first exemplary embodiment.

The present invention is also applicable to an imaging device whose image angle cannot be controlled from the outside. FIG. 4 is a block diagram illustrating an exemplary structure of the image angle variation detection device according to the variant of the first exemplary embodiment. The image angle variation detection device according to the present variant includes a video acquisition means 20, the position calculation means 11, a camera calibration information storing means 22, the image angle variation determination means 13, and a camera calibration information generation means 24.

The video acquisition means 20 shoots a video and inputs the video into the position calculation means 11 and the image angle variation determination means 13. The video acquisition means 20 is different from the video acquisition means 10 according to the first exemplary embodiment in that it is an imaging device whose image angle cannot be controlled from the outside. The video acquisition means 20 is realized by VCR (Video Cassette Recorder) or hard disk recorder, or the like, capable of reproducing recorded videos and acquiring the reproduced videos, not only camera.

The camera calibration information generation means 24 generates camera calibration information to be used by the position calculation means 11, and stores it in the camera calibration information storing means 22. The camera calibration information generation means 24 generates camera calibration information in any way. The camera calibration information generation means 24 may previously store the amount of motion of pixels relative to the predetermined zoom/pan/tilt amounts and calculate the amount of motion from an apparent motion of the videos when the image angle is varied, similarly as in the camera control information generation means 14, for example. The method for calculating camera calibration information is widely known, and thus a detailed description thereof will be omitted herein.

In this way, even if the image angle of the imaging device whose image angle cannot be controlled from the outside is varied, the camera parameters are changed thereby to properly calculate a three-dimensional (real space) position from a two-dimensional coordinate on the image.

Also in the present example, the feature tracking means 104 may determine whether the calculated image angle variation parameter is within the typical image angle variation range. Then, in the typical image angle variation range, the feature tracking means 104 may instruct the camera calibration information generation means 24 to generate camera calibration information. On the other hand, not in the typical image angle variation range, the position calculation means 11 cannot return to the state before the variation based on the camera calibration information. In this case, the feature tracking means 104 may only alert the varied image angle, and promote the user to perform manual calibration again.

Second Exemplary Embodiment

An image angle variation detection device according to a second exemplary embodiment of the present invention will be described below. The structure of the image angle variation detection device according to the present exemplary embodiment is similar to the structure illustrated in FIG. 1, but is different from the first exemplary embodiment in the contents of the image angle variation determination means 13.

Figure 5:
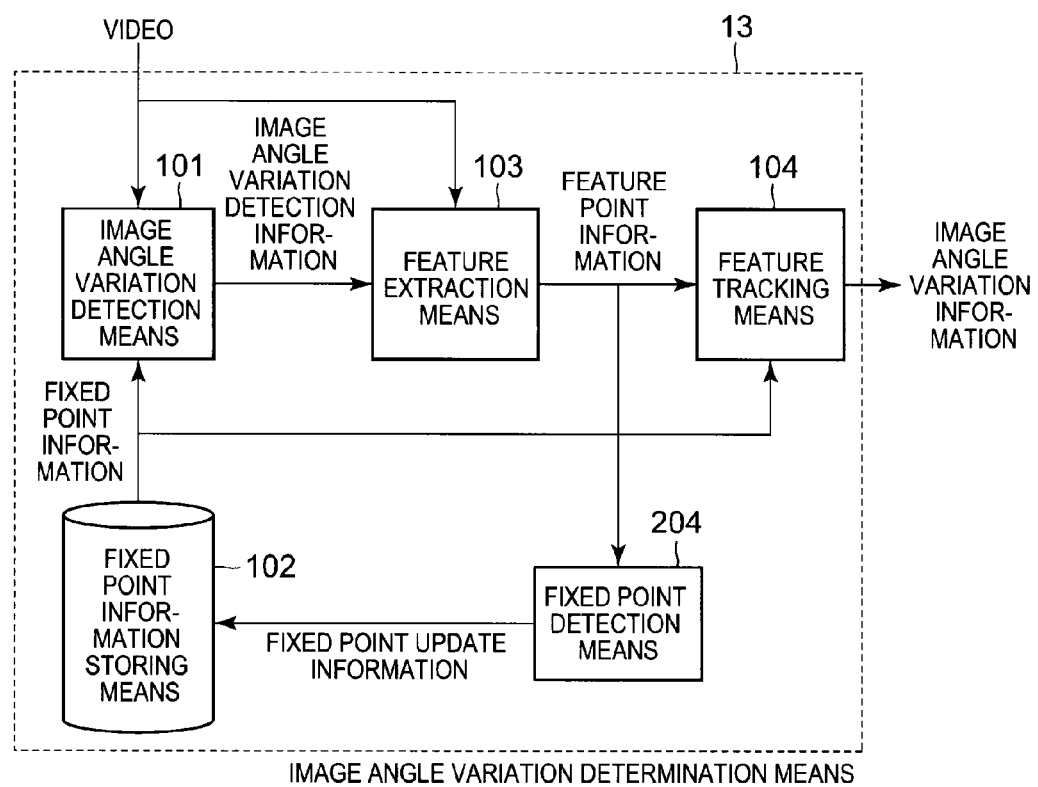
FIG. 5 It depicts a block diagram illustrating an exemplary structure of an image angle variation determination means according to a second exemplary embodiment.

FIG. 5 is a block diagram illustrating an exemplary structure of the image angle variation determination means 13 according to the second exemplary embodiment. The image angle variation determination means 13 according to the present exemplary embodiment includes the image angle variation detection means 101, the fixed point information storing means 102, the feature extraction means 103, the feature tracking means 104, and a fixed point detection means 204. The same constituents as in the first exemplary embodiment are denoted with the same reference numerals as in FIG. 2, and the description thereof will be omitted. In the present exemplary embodiment, the features of a feature point calculated by the feature extraction means 103 is also input into the fixed point detection means 204. In the following, the position of a feature point and the features of the feature point input from the feature extraction means 103 will be collectively denoted as feature point information.

The fixed point detection means 204 detects a feature point continuously present at the same position for a certain period of time among the feature points extracted by the feature extraction means 103 as a fixed point.

Specifically, the fixed point detection means 204 extracts and holds, as fixed point candidates, the feature point information on the feature points which are not collated with the fixed point among the feature points included in the feature point information input from the features extraction means 103. When being input with the feature point information extracted in the processing on a next frame from the feature extraction means 103, the fixed point detection means 204 compares the input feature point information with the held fixed point candidates, and determines whether the extracted feature point is continuously present at the same position. Whether the feature point is continuously present at the same position can be determined based on a change in the features of a point corresponding to the feature point. The fixed point detection means 204 may update the features of the feature point detected as being present at the same position.

Also when the position of the feature point does not change, the fixed point may be sometimes hidden behind the foreground due to occlusion or the like, and the feature point may not be confirmed. Thus, the fixed point detection means 204 may calculate the number of detections of a feature point for a certain period of time. When the number of detections within the period exceeds a predetermined threshold, the fixed point detection means 204 may detect the feature point as a fixed point.

The fixed point detection means 204 stores the feature point information on the feature point detected as a fixed point into the fixed point information storing means 102. That is, the fixed point detection means 204 updates the fixed point information stored in the fixed point information storing means 102. When calculating the number of detections in the period, the fixed point detection means 204 may assume the number of detections in the period as a reliability indicating likelihood of a fixed point for the feature point, associate the reliability with the feature point information, and store it in the fixed point information storing means 102.

The reliability is used by the feature tracking means 104 for collating a fixed point with a feature point, for example. For example, when selecting a pair of fixed point and feature point, the feature tracking means 104 may preferentially select a pair with a higher reliability. In this way, fixed point information with a high accuracy can be preferentially used.

The fixed point detection means 204 may calculate a feature point detection time and store it in the fixed point information storing means 102. Then, when the fixed point information storing means 102 stores a detection time, the fixed point detection means 204 determines that the feature point is not a fixed point when an elapsed time after the feature point was detected last exceeds a certain period of time, and may delete the feature point information on the feature point. In this way, fixed point information with a high accuracy can be kept.

Third Exemplary Embodiment

An image angle variation detection device according to a third exemplary embodiment of the present invention will be described below. The structure of the image angle variation detection device according to the present exemplary embodiment is similar to the structure illustrated in FIG. 1, but is different from the first exemplary embodiment in the contents of the image angle variation determination means 13. With the image angle variation detection device according to the present exemplary embodiment, a fixed point is changed depending on a shooting situation of the imaging device.

Figure 6:
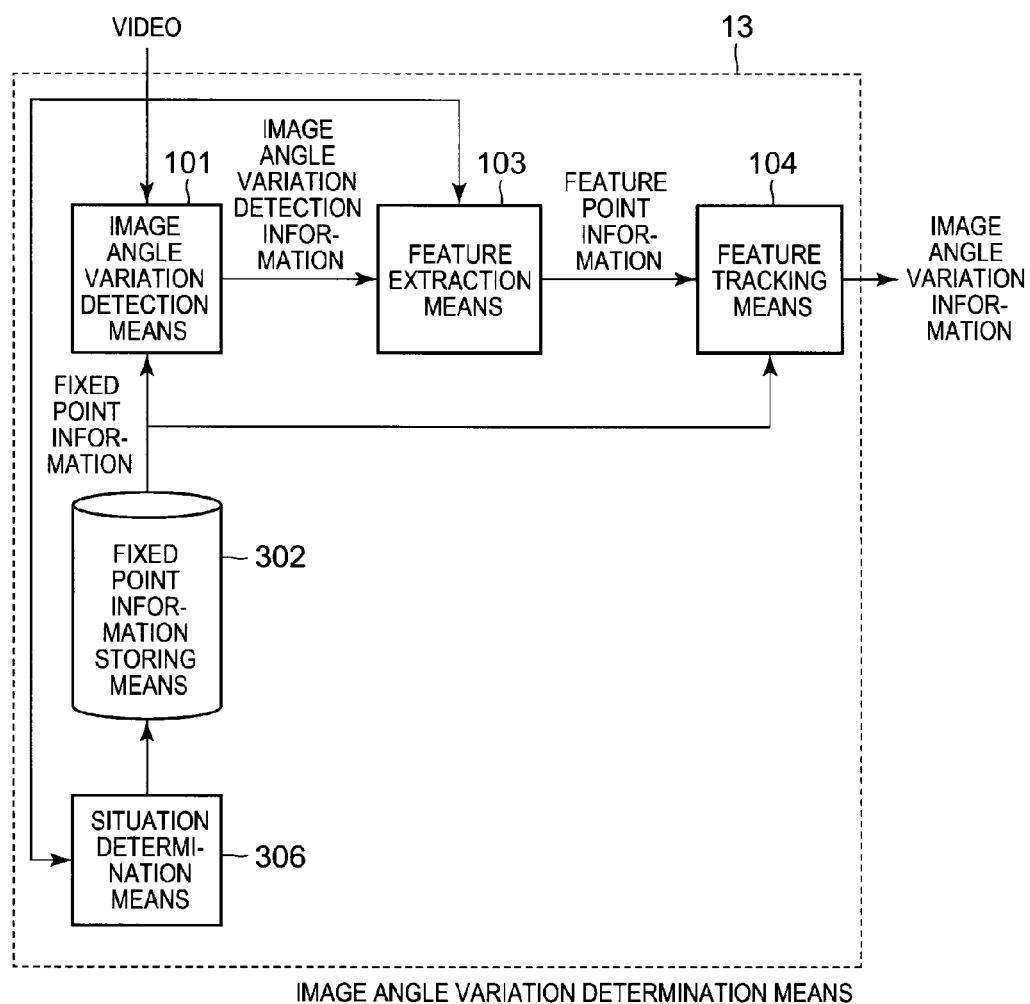
FIG. 6 It depicts a block diagram illustrating an exemplary structure of an image angle variation determination means according to a third exemplary embodiment.

FIG. 6 is a block diagram illustrating an exemplary structure of the image angle variation determination means 13 according to the third exemplary embodiment. The image angle variation determination means 13 according to the present exemplary embodiment includes the image angle variation detection means 101, a fixed point information storing means 302, the feature extraction means 103, the feature tracking means 104, and a situation determination means 306. The same constituents as in the first exemplary embodiment are denoted with the same reference numerals as in FIG. 2, and the description thereof will be omitted.

The situation determination means 306 determines a situation in which the imaging device shoots. Specifically, the situation determination means 306 determines how the imaging device presently shoots, such as brightness of an entire video or time, based on the videos shot by the imaging device. The situation determination means 306 may determine a shooting time zone (such as morning, noon, or night) based on brightness of an entire video or time, for example. The situation determination means 306 stores the information for identifying the situation (which will be denoted as situation identification information below) in the fixed point information storing means 302.

The situation identification information may employ indexes for determining a situation, for example. For example, when the situation is classified into two scenes of noon and night, the situation identification information may be defined with index 1 for noon and index 2 for night. Further, in order to indicate a transient situation between situations (such as situation from noon to night), the situation determination means 306 may generate the situation identification information indicating both of the situations. At this time, the situation determination means 306 may quantify the likelihood of each situation, and contain its value as reliability information in the situation identification information.

The fixed point information storing means 302 stores, as the fixed point information, the position of a fixed point and the features indicating the characteristics of the fixed point, and the information indicating a situation in which the fixed point is used together. The situation in which the fixed point is used may be information indicating a situation in which the fixed point is specified or information indicating a situation in which the fixed point is to be applied. For a fixed point applicable to a plurality of situations, a reliability for each situation may be used as information indicating a situation in which the fixed point is used.

The fixed point information storing means 302 may group and store commonly-used fixed points and situation-based fixed points. In this case, a situation-based fixed point is added to and used for the commonly-used fixed points depending on each situation.

The image angle variation detection means 101 selects fixed point information to be used based on the situation identification information, and detects whether the image angle of the video acquisition means 10 is varied from the input videos based on the selected fixed point information.

The feature tracking means 104 selects fixed point information to be used based on the situation identification information, and calculates an image angle variation parameter for transforming the position of each feature point into the position of the selected fixed point.

Generally, a fixed point specified by the image angle of the imaging device has a different effectiveness depending on hours such as noon, night or dawn. In the present exemplary embodiment, a fixed point is selected depending on a situation in which the imaging device shoots, and thus an accuracy of the image angle variation can be further enhanced.

The situation determination means according to the present exemplar embodiment may be applied to the image angle variation determination means 13 illustrated in the second exemplary embodiment.

Fourth Exemplary Embodiment

An image angle variation detection device according to a fourth exemplary embodiment of the present invention will be described below. The structure of the image angle variation detection device according to the present exemplary embodiment is similar to the structure illustrated in FIG. 1, but is different from the first exemplary embodiment in the contents of the image angle variation determination means 13.

Figure 7:
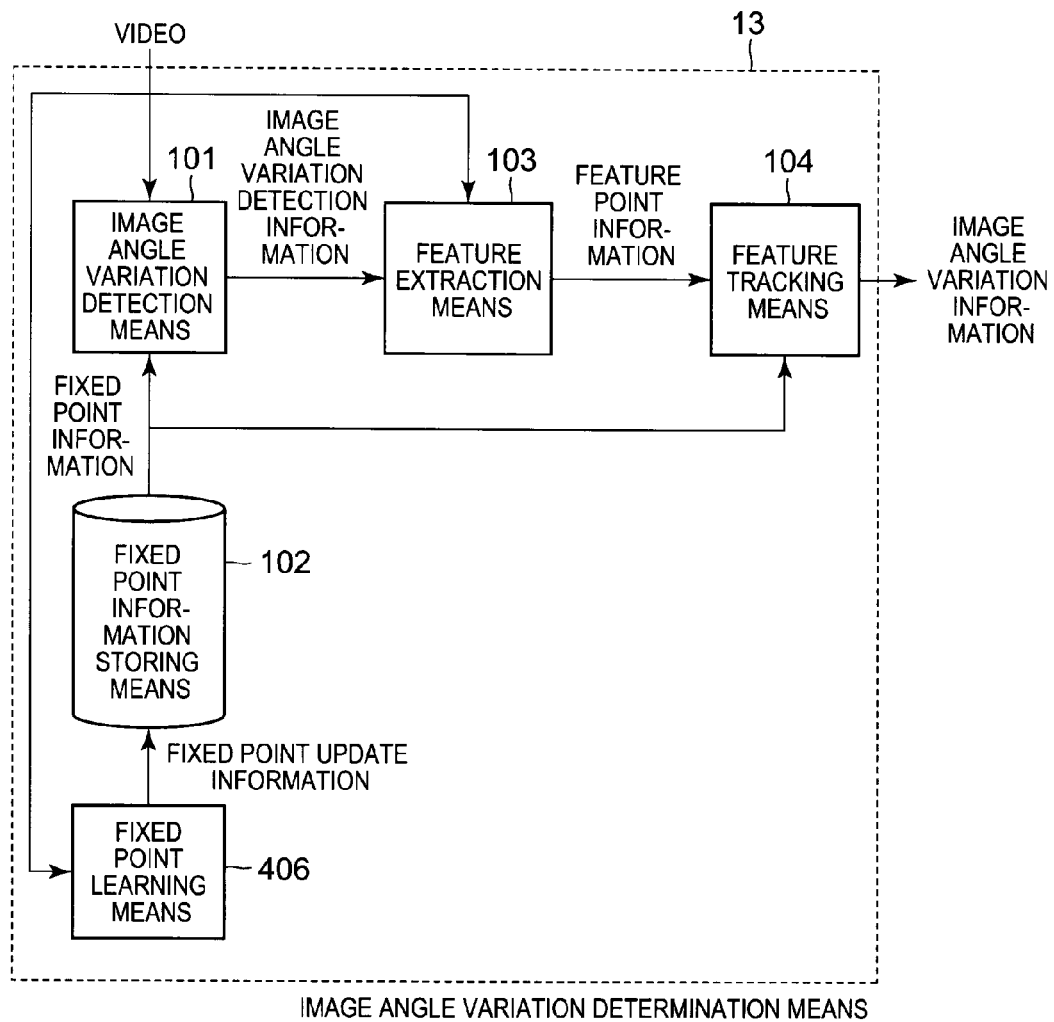
FIG. 7 It depicts a block diagram illustrating an exemplary structure of an image angle variation determination means according to a fourth exemplary embodiment.

FIG. 7 is a block diagram illustrating an exemplary structure of the image angle variation determination means 13 according to the fourth exemplary embodiment. The image angle variation determination means 13 according to the present exemplary embodiment includes the image angle variation detection means 101, the fixed point information storing means 102, the feature extraction means 103, the feature tracking means 104, and a fixed point learning means 406. The same constituents as in the first exemplary embodiment are denoted with the same reference numerals as in FIG. 2, and the description thereof will be omitted.

The fixed point learning means 406 automatically extracts a fixed point from the background image at an hour when the foreground is not determined to be present. The fixed point learning means 406 may determine that the foreground is not present when the videos in the frames do not change for a certain period of time, or may specify an hour when the foreground is not present in response to a manual instruction. The fixed point learning means 406 extracts a fixed point and stores it in the fixed point information storing means 102 in the same way that the fixed point detection means 204 according to the second exemplary embodiment detects a fixed point. Thus, fixed point information with a higher accuracy can be acquired.

Figure 8:
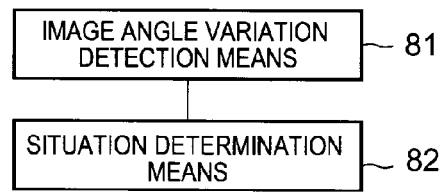
FIG. 8 It depicts a block diagram illustrating the outline of an image angle variation detection device according to the present invention.

The outline of the present invention will be described below by way of example. FIG. 8 is a block diagram illustrating the outline of an image angle variation detection device according to the present invention. The image angle variation detection device according to the present invention includes an image angle variation detection means 81 (the image angle variation detection means 101, for example) for detecting an image angle variation of an imaging device from the videos shot by the imaging device based on fixed point information including the position of a fixed point specified by an image angle of the imaging device (the video acquisition means 10, for example) and the features indicating the characteristics of the fixed point, and a situation determination means 82 (the feature tracking means 104, for example) for determining that the image angle of the imaging device is varied when a change in the image angle variation is stable for a certain period of time.

With the structure, it is possible to properly detect an image angle variation depending on a shooting environment of the imaging device.

The image angle variation detection device may include a feature point extraction means (the feature extraction means 103, for example) for extracting a feature point from a video shot by the imaging device, and a parameter calculation means for calculating an image angle variation parameter as a parameter for transforming the position of the feature point into the position of a corresponding fixed point. The situation determination means 82 may then determine that the image angle of the imaging device is varied when a change in the image angle variation parameter between frames of videos shot by the imaging device is stable for a certain period of time.

The feature point extraction means may calculate the features of a feature point extracted from a video shot by the imaging device, and when a distance between the features of the feature point and the features of the fixed point is a predetermined threshold or less, or a similarity between the features of the feature point and the features of the fixed point is a predetermined threshold or more, the parameter calculation means may determine that the fixed point corresponds to the feature point, and calculate an image angle variation parameter.

The image angle variation detection device may include a fixed point detection means (the fixed point detection means 204, for example) for detecting a feature point continuously present at the same position for a certain period of time among the feature points extracted by the feature point extraction means as a fixed point. In this case, an accuracy of a fixed point to be used can be enhanced.

The image angle variation detection means 81 may calculate the number of fixed points for which the features at the same position as the position of a fixed point in the video input from the imaging device almost match with the features of the fixed point, and determine that the image angle is varied when a certain number of matched fixed points or more is not present.

The image angle variation detection device may further include a fixed point storage means (the fixed point information storing means 102, for example) for storing fixed point information therein. Then, the image angle variation detection means 81 may detect an image angle variation of the imaging device based on the stored fixed point information.

The image angle variation detection device may further include a situation determination means (the situation determination means 306, for example) for determining a situation in which the imaging device shoots. Then, the fixed point storage means may store fixed point information including information indicating a situation in which a fixed point is used, and the image angle variation detection means 81 may select the fixed point information depending on the determined situation from among the fixed point information stored in the fixed point storage means, and detect an image angle variation of the imaging device from the videos shot by the imaging device based on the fixed point information.

The present invention has been described above with reference to the exemplary embodiments and the examples, but the present invention is not limited to the above exemplary embodiments and examples. The structure and details of the present invention may be variously changed within the scope of the present invention understandable by those skilled in the art.

The present application claims the priority based on Japanese Patent Application No. 2012-156772 filed on Jul. 12, 2012, the disclosure of which is entirely incorporated herein.

INDUSTRIAL APPLICABILITY

The present invention is suitably applicable to detect an image angle variation of an imaging device.

REFERENCE SIGNS LIST

10, 20 Video acquisition means
11 Position calculation means
12, 22 Camera calibration information storing means
13 Image angle variation determination means
14 Camera control information generation means
24 Camera calibration information generation means
101 Image angle variation detection means
102, 302 Fixed point information storing means
103 Feature extraction means
104 Feature tracking means
204 Fixed point detection means
306 Situation determination means
406 Fixed point learning means

What is claimed is:

1. An image angle variation detection device comprising:
an image angle variation detection unit implemented by hardware including a processor, and which detects an image angle variation of an imaging device from videos shot by the imaging device based on fixed point information including the position of a fixed point specified by an image angle of the imaging device and the features indicating the characteristics of the fixed point;
a feature point extraction unit implemented by the hardware which extracts a feature point from a video shot by the imaging device; and
a fixed point update unit implemented by the hardware, and which updates the fixed point information by evaluating stability based on a number of detections of the feature points within a period, or updates the fixed point information from the detected feature points when there is no change in the position of the feature point between frames during a certain period of time; and a situation determination unit implemented by the hardware and which determines that the image angle of the imaging device is varied when a change in the image angle variation is stable for a certain period of time, wherein the change in the image angle variation being stable for the certain period of time is determined from a change in an image angle variation parameter between frames of videos shot by the imaging device is stable for the certain period of time, and when the image angle variation is in a range in which the imaging device cannot be returned to the non-varied state based on a camera control information, the situation determination unit alerts a user to the varied image angle.

2. The image angle variation detection device according to claim 1, comprising:

a parameter calculation unit implemented by the hardware and which calculates the image angle variation parameter as a parameter for transforming the position of the feature point into the position of a corresponding fixed point, wherein when a change in the image angle variation parameter between the frames of the videos shot by the imaging device is stable for the certain period of time, the situation determination unit determines that the image angle of the imaging device is varied.

3. The image angle variation detection device according to claim 2, wherein the feature point extraction unit calculates the features of a feature point extracted from a video shot by the imaging device, and when a distance between the features of the feature point and the features of a fixed point is a predetermined threshold or less or a similarity between the features of the feature point and the features of a fixed point is a predetermined threshold or more, the parameter calculation unit determines that the fixed point corresponds to the feature point, and calculates an image angle variation parameter.

4. The image angle variation detection device according to claim 2, comprising:

a fixed point detection unit implemented by the hardware and which detects, as a fixed point, a feature point continuously present at the same position for a certain period of time among the feature points extracted by the feature point extraction unit.

5. The image angle variation detection device according to claim 1, wherein the image angle variation detection unit calculates the number of fixed points for which the features at the same position as the position of the fixed point almost match with the features of the fixed point in videos input by the imaging device, and when a certain number of matched fixed points or more is not present, determines that the image angle is varied.

6. The image angle variation detection device according to claim 1, comprising:

a fixed point storage unit implemented by the hardware and which stores fixed point information therein, wherein the image angle variation detection unit detects an image angle variation of the imaging device based on the stored fixed point information.

7. The image angle variation detection device according to claim 6, comprising:

a situation determination unit implemented by the hardware and which determines a situation in which the imaging device shoots, wherein the fixed point storage unit stores fixed point information including information indicating a situation in which a fixed point is used, and the image angle variation detection unit selects fixed point information depending on the determined situation from the fixed point information stored in the fixed point storage unit, and detects an image angle variation of the imaging device from videos shot by the imaging device based on the selected fixed point information.

8. An image angle variation detection method comprising:

detecting an image angle variation of an imaging device from videos shot by the imaging device based on fixed point information including the position of a fixed point specified by an image angle of the imaging device and the features indicating the characteristics of the fixed point;

extracting a feature point from a video shot by the imaging device; and updating the fixed point information by evaluating stability based on a number of detections of the feature points within a period, or updating the fixed point information from the detected feature points when there is no change in the position of the feature point between frames during a certain period of time; and determining that the image angle of the imaging device is varied when a change in the image angle variation is stable for a certain period of time, wherein the change in the image angle variation being stable for the certain period of time is determined from a change in an image angle variation parameter between frames of videos shot by the imaging device is stable for the certain period of time, and wherein determining that the image angle of the image device is varied comprises, when the image angle variation is in a range in which the imaging device cannot be returned to the non-varied state base on a camera control information, alerting the varied image angle.

9. A non-transitory computer readable information recording medium storing an image angle variation detection program, when executed by a processor, that performs a method for:

detecting an image angle variation of an imaging device from videos shot by the imaging device based on fixed point information including the position of a fixed point specified by an image angle of the imaging device and the features indicating the characteristics of the fixed point;

extracting a feature point from a video shot by the imaging device; and updating the fixed point information by evaluating stability based on a number of detections of the feature points within a period, or updating the fixed point information from the detected feature points when there is no change in the position of the feature point between frames during a certain period of time; and determining that the image angle of the imaging device is varied when a change in the image angle variation is stable for a certain period of time, wherein the change in the image angle variation being stable for the certain period of time, wherein determining that the image angle of the image device is varied comprises, when the image angle variation is in a range in which the imaging device cannot be returned to the non-varied state base on a camera control information, alerting the varied image angle.

10. The non-transitory computer readable information recording medium according to claim 9, comprising:
calculating the image angle variation parameter as a parameter for transforming the position of the feature point into the position of a corresponding fixed point; and when a change in the image angle variation parameter between the frames of the videos shot by the imaging device is stable for the certain period of time, determining that the image angle of the imaging device is varied.

11. The image angle variation detection device according to claim 1, comprising: a fixed point learning unit implemented by the hardware, and which extracts a fixed point from the background image at an hour when the foreground is not determined to be present.

12. The image angle variation detection method according to claim 8, comprising:
calculating an image angle variation parameter as a parameter for transforming the position of the feature point into the position of a corresponding fixed point; and when a change in the image angle variation parameter between frames of videos shot by the imaging device is stable for a certain period of time, determining that the image angle of the imaging device is varied.

\* \* \* \* \*